United States Patent [19]

Kollias et al.

[11] Patent Number: 5,590,640
[45] Date of Patent: Jan. 7, 1997

[54] PROTECTIVE GUARD FOR OUTDOOR GRILL

[75] Inventors: Michael Kollias; Steve Addington, both of Wheaton; Bud Kanak, Winfield, all of Ill.

[73] Assignee: KAK Enterprises, Winfield, Ill.

[21] Appl. No.: 320,204

[22] Filed: Oct. 7, 1994

[51] Int. Cl.⁶ .................................................... A47T 37/00
[52] U.S. Cl. ............................ 126/25 R; 126/42; 126/201
[58] Field of Search ........................... 126/201, 42, 25 R, 126/25 AA, 25 A, 25 B, 25 C

[56] References Cited

U.S. PATENT DOCUMENTS

| | | |
|---|---|---|
| 163,858 | 6/1875 | Enos .......................................... 126/201 |
| 485,363 | 11/1892 | Adrianson ................................ 126/201 |
| 806,160 | 12/1905 | Metz . |
| 1,179,713 | 4/1914 | Gallsworthy . |
| 1,332,474 | 3/1920 | Skelly . |
| 1,440,336 | 12/1922 | Buffington . |
| 1,542,227 | 6/1925 | Fisher et al. . |
| 2,757,675 | 9/1973 | Wilbricht . |
| 3,276,440 | 10/1961 | Salegar . |
| 4,314,543 | 2/1982 | Bullington et al. . |
| 4,467,781 | 8/1984 | Campbell . |
| 4,527,540 | 7/1985 | Ryan et al. . |
| 4,870,948 | 10/1989 | Wallace . |
| 5,117,807 | 6/1992 | Graulich . |
| 5,165,384 | 11/1992 | Knutson . |

FOREIGN PATENT DOCUMENTS 1805 of 1889 United Kingdom .................... 126/201

*Primary Examiner*—Larry Jones
*Attorney, Agent, or Firm*—Banner & Witcoff, Ltd.

[57] ABSTRACT

A protective guard for an outdoor grill is provided, comprising a support strip and a plurality of protective spars. The support strip conforms to the outer perimeter of the grill's kettle, and is mounted onto the kettle, generally horizontal to the ground. The protective spars are connected to the support strip, and suspend downward from the support strip towards the ground, along the outer surface of the kettle. The apparatus provides a lightweight, removable barrier around the kettle, to prevent humans or household pets from coming into contact with the hot outer surface of the kettle. The apparatus is simple in design, with relatively few parts, and is easy to manufacture. The apparatus is also easy to assemble, and can be modified to fit any of a number of different sizes or shapes of barbecue grills, as an add-on accessory.

10 Claims, 3 Drawing Sheets

PROTECTIVE GUARD FOR OUTDOOR GRILL

BACKGROUND OF THE INVENTION

1. Field of the Invention

This invention relates generally to residential outdoor barbecues grill. More particularly, the invention relates to a protective guard for preventing humans and household pets from coming into inadvertent contact with the hot outer surface of the barbecue grill.

2. Discussion of the Prior Art

Outdoor barbecue grills have been used by families for many years, in extremely high numbers. Although they take many different forms, a typical barbecue grill generally includes a firebox or kettle, with an open top, and a hinged or removable lid that fits onto the top of the kettle. Inside the kettle is a cooking chamber, where a mesh or grate is supported above hot coals or gas-fed flames.

For a typical grill, the outside of the kettle can reach extremely high temperatures. Any contact with the outer surface of the kettle can cause serious burns, and leave lasting scars. The risk of injury is particularly high where young children are about, because of their natural curiosity and their small size.

Various approaches have been tried to address this problem. For instance, U.S. Pat. No. 5,165,384 (Knutson) discloses a mesh housing for suspending a barbecue grill off of a balcony. However, this approach depends on the user having a balcony. The approach also relies on the use of a heavy mesh cage, which supports the entire weight of the grill assembly and its contents. Because the grill rests fully inside the mesh cage, access to various vents and openings in the side and bottom of the grill's kettle can be restricted.

U.S. Pat. No. 3,757,675 (Wilbricht) discloses a barbecue grill having expanded metal sides to prevent inadvertent contact with the grill's firebox. However, the expanded metal sides are an integral part of a particular grill assembly, and cannot be removed or adapted to work with all types and sizes of barbecue grills as an aftermarket addition.

In addition, each of these approaches involves a relatively complex assembly, with many parts. The skills necessary to assemble these devices are generally beyond the skills of most lay persons.

As such, there continues to be a need for a protective guard that is lightweight and easy to construct, which can be easily adapted to work with any of a number of different shapes and sizes of barbecue grills, and which does not restrict access to the various vents and openings in the side and bottom of the grill's kettle. These and a number of additional benefits are provided by the invention claimed and disclosed herein.

SUMMARY OF THE INVENTION

In a basic aspect, the invention comprises a protective guard for an outdoor grill, comprising a support strip and a plurality of protective spars. The support strip conforms to the outer perimeter of the grill's kettle, and is mounted onto the kettle, generally horizontal to the ground. The protective spars are connected to the support strip, and suspend downward from the support strip towards the ground, along the outer surface of the kettle. The apparatus provides a lightweight, removable barrier around the kettle, to prevent humans or household pets from coming into contact with the hot outer surface of the kettle.

The apparatus is simple in design, with relatively few parts, and is easy to manufacture. The apparatus is also easy to assemble, and can be modified to fit any of a number of different sizes or shapes of barbecue grills, as an add-on accessory.

DESCRIPTION OF THE PREFERRED EMBODIMENTS

Figure 1:
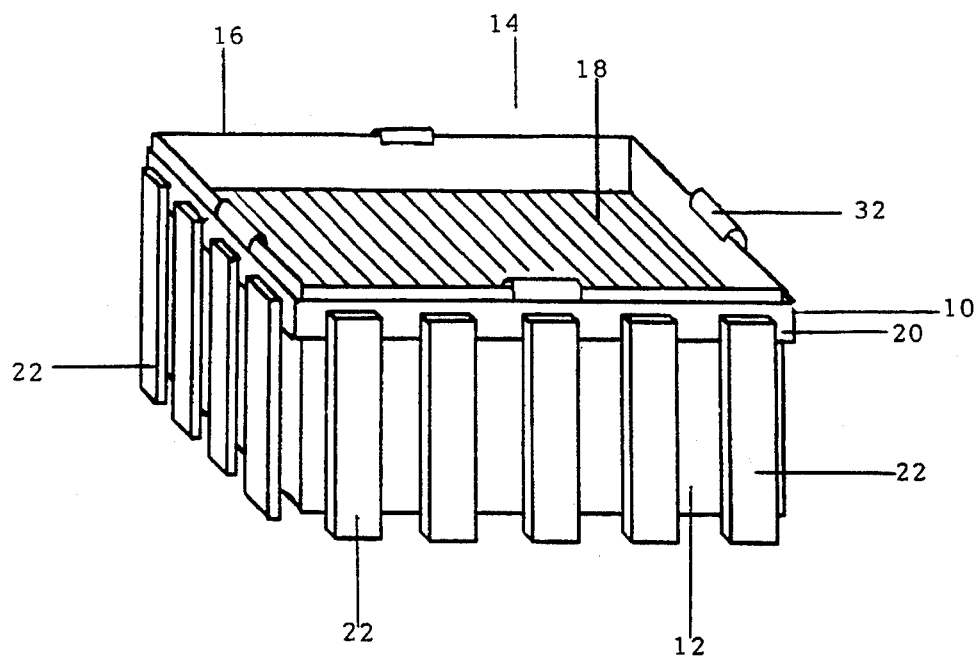
FIG. 1 of the drawing is an isometric illustration of the invention, in combination with a barbecue having a rectangular box-shaped kettle.
Figure 2:
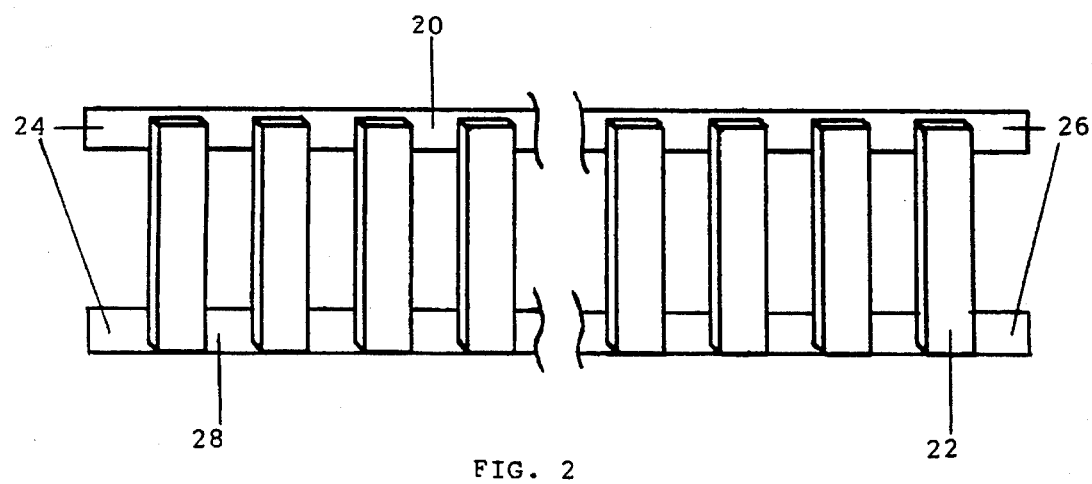
FIG. 2 of the drawing is a view of the claimed protective guard, with the ends of the support strip disconnected, and the support strip straightened and flattened.
Figure 3:
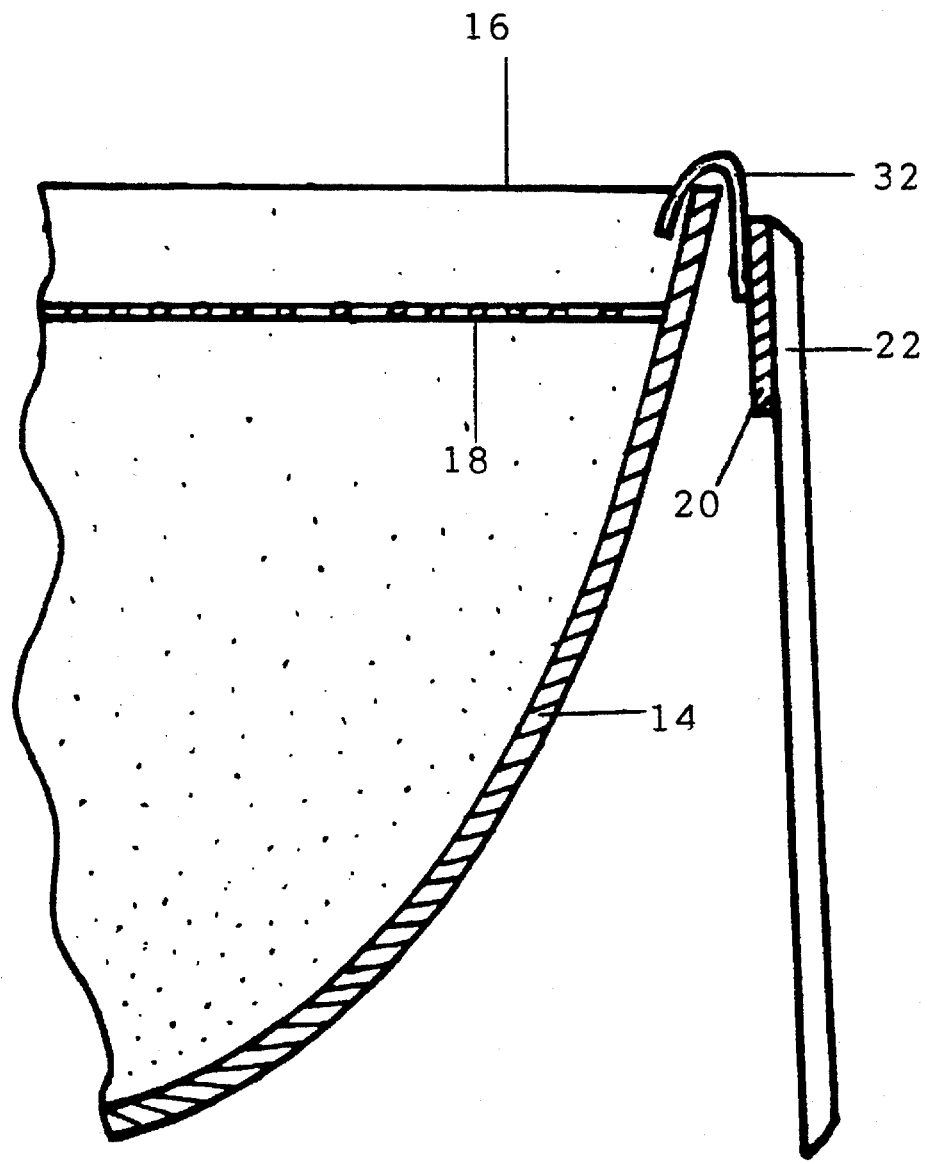
FIG. 3 of the drawing is a cross-section view of a hemispherical barbecue grill with the guard in place, a showing a particular means for suspending the protective guard from the grill.

Referring now to the drawings, and in particular to FIGS. 1–3 thereof, various details of a preferred embodiment are shown.

As shown in FIG. 1, the apparatus 10 is used in combination with a standard barbecue grill of the type having a kettle 12, with an opening 14 at its top end. A lip 16 extends around the perimeter of the kettle's opening. A lid (not shown) may be placed on top of the kettle to close off the cooking compartment. A mesh or grate 18 is suspended inside the kettle, to support food over coals or gas flames. One or more handles (not shown) may project outward from the outer surfaces of the kettle, to permit the kettle to be lifted and moved.

The protective guard 10 generally comprises a support strip 20 and a plurality of protective spars 22. The support strip 20 is shaped to conform to the outer shape of the kettle, and mounts onto the outer perimeter of the kettle, horizontal to the ground. The protective spars 22 are connected to and supported by the support strip 20, and suspend downward from the support strip towards the ground along the outer surface of the kettle. For mounting the apparatus onto a kettle, a plurality of hooks 32 are provided at intervals along the strip 20. These hooks are adapted and positioned to engage the lip 16 of the kettle 12 as the apparatus 10 is lowered into place over the kettle. If desired, a second support strip (shown in FIG. 2) can be connected to the spars, between the first support strip and the opposite end of the spars. If desired, a second support strip can be connected to the spars, between the first support strip and the opposite end of the spars. The use of a second support strip will provide additional support and rigidity to the overall apparatus 10.

The spars 22 can be connected to the strip in a number of known ways, including screws, bolts or rivets. Generally, a hole drilled through the end of a spar is aligned with a corresponding hole in the strip 20. A screw, bolt or rivet is then passed through the holes in the spar and the strip, and is fixed in place.

The spars 22 can extend all the way to the ground if desired, or can extend some intermediate distance toward the ground. Preferably, the spars are parallel to one another, and perpendicular to the ground, and are spaced evenly around the support strip. However, other configurations will be apparent to persons of ordinary skill in the art, and individual spars can be omitted or modified to accommodate structures, such as handles, that might project outward from the outer surface of the kettle 12.

In general, the spars should be close enough to one another to prevent a child from reaching between the spars to contact the hot surface of the kettle, while still providing adequate access to any vents or other features on the outer surface of the kettle. Alternatively, the spars can be spaced extremely close to one another, to form a continuous barrier around the kettle. The spars can be made of any suitable fire or heat resistant material, including fire or flame resistant wood.

The guard, and in particular the support strip 20, can be pre-shaped to fit around a specific size and shape of grill. Alternatively, the guard can be manufactured, sold and shipped to the user or purchaser in a flattened unassembled form, as shown in FIG. 2. In that case, the strip is manufactured from some bendable material, so that the user or purchaser of the guard can then bend the strip to the desired shape to fit any size or shape of grill, and can adjust the length of the strip as needed by simply cutting the strip.

As shown in FIG. 2, where a bendable strip is used, the strip will have first and second free ends, 24 and 26, respectively. Once the strip has been bent and cut to conform to the particular grill being fitted, the free ends 24 and 26 are connected together in any of a number of known manners, including clamps, screws, bolts or rivets. For ease of assembly by laypersons, screws or bolts are preferred for connecting the ends 24 and 26 of the strip. A plurality of holes can be provided along the length of the strip 20 to receive the screws or bolts, while allowing the shape and length of the strip to be adjusted. Alternatively, the strip can be provided to the user free of such holes, allowing the user to drill holes in the appropriate places once the strip has been cut to fit a particular grill.

Figure 4:
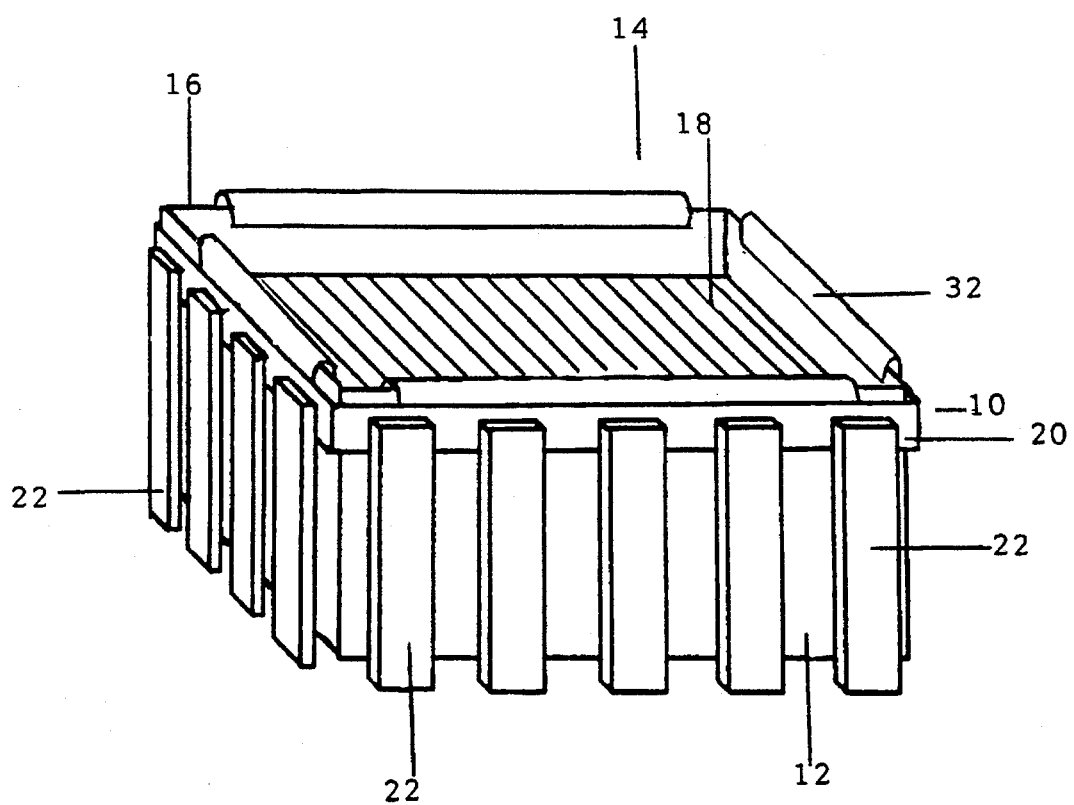
FIG. 4 of the drawing is an isometric illustration of the intention, in combination with a barbecue having a rectangular box-shaped kettle, showing an example of the uppermost edge of the support strip forming a continuous hook-shaped portion along substantially the entire length of the support strip.

FIG. 3 is a cross-section view taken through the kettle of a hemispherically shaped grill, with a grill guard in place. As shown in that figure, the support strip 20 has a relatively narrow cross-sectional width, preferably 1/16th to 1/8th inch for steel or aluminum. For mounting the apparatus onto a kettle, a plurality of hooks 32 are provided at intervals along the strip 20. These hooks are adapted and positioned to engage the lip 16 of the kettle 12 as the apparatus 10 is lowered into place over the kettle. Alternatively, as shown in FIG. 4, the top edge of the strip can incorporate a continuous hook shape along substantially the entire upper edge of the strip, which will engage the lip 16 around substantially the entire perimeter of the opening 14. Alternatively, the top edge of the strip can incorporate a continuous hook shape along the entire upper edge of the strip, which will engage the lip, 16 around the entire perimeter of the opening 14. This will provide a consistent, level surface for the grill's lid to rest upon, ensuring a good seal between the lid and the kettle.

In use, the grill guard is shaped to fit onto a particular size and shape of grill, and is then lowered over the kettle of the grill until the hooks 32 engage the lip 14 of the kettle. The guard can be easily removed by simply lifting it off of the kettle.

The foregoing examples are illustrative of various particularly preferred embodiments of the invention. However, they are not intended to limit the scope of the invention as claimed below, and it will be understood to persons of skill in the art that various modifications to these embodiments may be made without departing from the true scope and spirit of the invention that is claimed below.

What is claimed is as follows:

1. A protective guard for an outdoor grill having an open-topped kettle, said protective guard comprising a support strip, and a plurality of protective spars connected to the support strip and suspending downward from the support strip towards the ground along the outer surface of the kettle, the uppermost edge of said support strip forming a continuous hook-shaped portion along substantially the entire length of the support strip, said continuous hook-shaped portion being adapted to engage the periphery of the opening of the kettle for mounting the protective guard onto the kettle.

2. The protective guard of claim 1, wherein the support strip is rigid.

3. The protective guard of claim 1, wherein the support strip is flexible, with first and second ends releasably connectable to one another.

4. The protective guard of claim 3, wherein the support strip is made of spring steel.

5. The protective guard of claim 1, in which the protective spars are parallel to one another, and spaced apart at intervals along the support strip.

6. The protective guard of claim 1, in which the protective spars form a continuous surface around the outer perimeter of the kettle.

7. The protective guard of claim 1, in which the support strip forms a circle, to conform to the outer perimeter of a hemispherically shaped kettle.

8. The protective guard of claim 1, in which the support strip forms a rectangle, to conform to the outer perimeter of a box shaped kettle.

9. The protective guard of claim 1, in which the spars are composed of heat resistant wood.

10. The protective guard of claim 1, further comprising a second support strip connected to the spars, horizontal to the ground, between the first support strip and the opposite end of the spars.

* * * * *

UNITED STATES PATENT AND TRADEMARK OFFICE
CERTIFICATE OF CORRECTION

PATENT NO.: 5,590,640

DATED: January 7, 1997

INVENTOR(S): Kollias et al.

It is certified that error appears in the above-identified patent and that said Letters Patent is hereby corrected as shown below:

Col. 2, ln. 55 reads "support strip (shown in Fig. 2) and should read --support strip 28 (shown in Fig. 2)--

Col. 3, lns. 54 and 55 and Col. 4, lns. 1 and 2 reading as follows: "Alternatively, the top edge of the strip can incorporate a continuous hook shape along the entire upper edge of the strip, which will engage the lip 16 around the entire perimeter of the opening 14." This language should be deleted.

Signed and Sealed this

Eighteenth Day of November 1997

Attest:

BRUCE LEHMAN

Attesting Officer

Commissioner of Patents and Trademarks